(12) United States Patent
Mandal et al.

(10) Patent No.: US 8,884,971 B2
(45) Date of Patent: Nov. 11, 2014

(54) ANIMATION ENGINE DECOUPLED FROM ANIMATION CATALOG

(75) Inventors: Aditi Mandal, Bothell, WA (US); Arye Gittelman, Mercer Island, WA (US); Lionel Robinson, Bothell, WA (US); Joy Seth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 13/249,267

(22) Filed: Sep. 30, 2011

(65) Prior Publication Data

US 2013/0083034 A1 Apr. 4, 2013

(51) Int. Cl.
*G06T 13/00* (2011.01)

(52) U.S. Cl.
CPC ............ *G06T 13/00* (2013.01); *G06T 2213/04* (2013.01); *G06T 2213/08* (2013.01)
USPC .......................................... 345/473; 715/760

(58) Field of Classification Search
CPC ... G06F 3/0481; G06F 3/0485; G06F 3/0483; G09G 5/14; A63F 13/12; A63F 13/10; G06T 13/40; G06T 13/00; G06T 13/80; G06T 13/20
USPC .......................................... 345/473; 715/760
See application file for complete search history.

(56) References Cited

U.S. PATENT DOCUMENTS

| | | | |
|---|---|---|---|
| 6,952,206 B1 * | 10/2005 | Craighead ..................... | 345/422 |
| 7,088,374 B2 | 8/2006 | David et al. | |
| 7,830,385 B2 | 11/2010 | Kulas | |
| 7,903,115 B2 | 3/2011 | Platzer et al. | |
| 2004/0233201 A1 * | 11/2004 | Calkins et al. ................ | 345/473 |
| 2007/0139418 A1 * | 6/2007 | Abel et al. ..................... | 345/474 |
| 2007/0162842 A1 | 7/2007 | Ambachtsheer et al. | |
| 2008/0165210 A1 * | 7/2008 | Platzer et al. ................. | 345/672 |
| 2009/0228782 A1 | 9/2009 | Fraser | |
| 2009/0322760 A1 * | 12/2009 | Kwiatkowski et al. ........ | 345/473 |
| 2010/0214299 A1 * | 8/2010 | Robertson et al. ............ | 345/440 |
| 2011/0292050 A1 * | 12/2011 | Gotz ............................. | 345/441 |
| 2012/0249535 A1 * | 10/2012 | Castineiras ................... | 345/419 |
| 2012/0297292 A1 * | 11/2012 | Dougherty et al. ........... | 715/238 |
| 2013/0127875 A1 * | 5/2013 | Blas et al. ..................... | 345/473 |

OTHER PUBLICATIONS

"Mojo.Animation", Retrieved at <<https://developer.palm.com/content/api/reference/mojo/classes/mojo-animation.html>>, Retrieved Date: Aug. 1, 2011, pp. 3.
"Importing multiple animations from FBX files in 4.0", Retrieved at <<http://forums.create.msdn.com/forums/p/608451459967.aspx>>, Retrieved Date: Aug. 1, 2011, pp. 4.
".animate( )—jQuery API", Retrieved at <<http://api.jquery.com/animate>>, Retrieved Date: Aug. 16, 2011, pp. 12.

* cited by examiner

*Primary Examiner* — Maurice L McDowell, Jr.
(74) *Attorney, Agent, or Firm* — Tim Wong; Jim Ross; Micky Minhas (57) ABSTRACT

Embodiments provide animations with an animation engine decoupled from an animation catalog storing animation definitions. A computing device accesses at least one of the animation definitions corresponding to at least one markup language (ML) element to be animated. Final attribute values associated with the ML element are identified (e.g., provided by the caller or defined in the animation definition). The computing device animates the ML element using the accessed animation definition and the identified final attribute values. In some embodiments, the animation engine uses a single timer to animate a plurality of hypertext markup language (HTML) elements displayed by a browser.

20 Claims, 5 Drawing Sheets

ANIMATION ENGINE DECOUPLED FROM
ANIMATION CATALOG

BACKGROUND

Animations in documents enhance the user experience. For example, animations improve the usability and visual appeal of a website. Example animation include deleting a table from a web page, moving a hypertext markup language (HTML) element from one position to another, or otherwise visually altering HTML elements. With existing systems, however, ensuring a consistent look-and-feel to the animation experience across multiple web pages or in a platform environment is difficult. For example, some existing systems require developers to code the animations into each caller of the animation engines. For example, to ensure the same look-and-feel, some existing systems require developers to code the exact same animation calls multiple times in the product. In such environments, attempting to apply an update to an animation necessitates an update to each of the calls to invoke the animation engines. Similarly, to construct complex animations with some existing systems, developers have to modify each of the calls to invoke the animation engine with custom code.

SUMMARY

Embodiments of the disclosure provide decoupled animation of markup language (ML) elements. A computing device accesses at least one animation definition corresponding to at least one markup language (ML) element to be animated. One or more final attribute values associated with the ML element are identified. The computing device animates the ML element using the accessed animation definition and the identified final attribute values. In some embodiments, a single timer is used to coordinate animation of multiple ML elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide animation of markup language (ML) elements or objects using an animation engine 106 decoupled from a catalog 110 that includes a library of animation definitions 210. In some embodiments, the animation engine 106 executes a single timer to operate on a plurality of animations to enable smooth and coordinated animation.

Decoupling the animation engine 106 from the catalog 110 that contains the animation definitions 210 allows animation providers 114 or developers to easily configure the animations by making changes to the catalog 110, rather than to each invocation of the animation engine 106. For example, timings, positions, and durations of existing animation in the catalog 110 may be adjusted, and new animations may be added to the catalog 110. Because the catalog 110 is available to multiple elements in multiple pages and scenarios trying to execute the same animation, the changes to the catalog 110 are available to each of these elements without the need to re-create or re-apply the animation changes multiple times. As such, embodiments of the disclosure enable a consistent animation personality across web pages.

While aspects of the disclosure are described with reference to the ML element being a hypertext markup language (HTML) element, embodiments of the disclosure are operable with any object to be animated. Further, aspects of the disclosure are not limited to animations on web pages, and instead contemplate animations in any document capable of displaying output from the animation engine 106.

Figure 1:
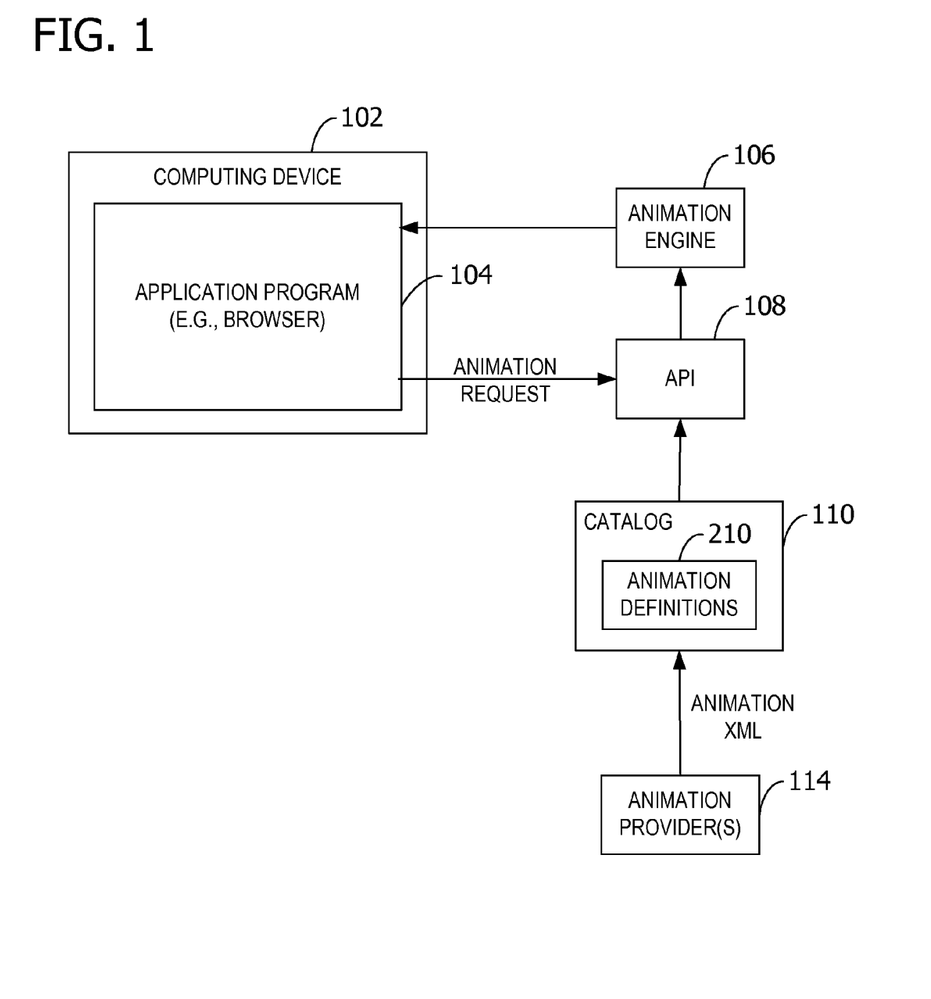
FIG. 1 is an exemplary block diagram illustrating an animation engine using a catalog of animation definitions to animate markup language elements.

Referring next to FIG. 1, an exemplary block diagram illustrates the animation engine 106 using the catalog 110 of animation definitions 210 to animate markup language elements. In the example of FIG. 1, the animation engine 106 is separate from, although optionally associated with or executed by, a computing device 102 that requests the animation and displays the animation (e.g., to a user 202). In such embodiments, the animation engine 106 may execute as a server or a cloud service 506 receiving animation requests from the computing device 102 and providing animations for display on the computing device 102. In other embodiments (e.g., see FIG. 2), operation of the animation engine 106 is performed by the computing device 102.

In the example of FIG. 1, the animation requests are received, for example, through the use of application programming interfaces (APIs) 108 called by application programs 104 executing on the computing device 102. In some embodiments, a browser executing on the computing device 102 generates the animation request. While shown external to the computing device 102 in FIG. 1, the APIs 108, or a portion thereof, may be stored and invoked locally on the computing device 102.

Figure 2:
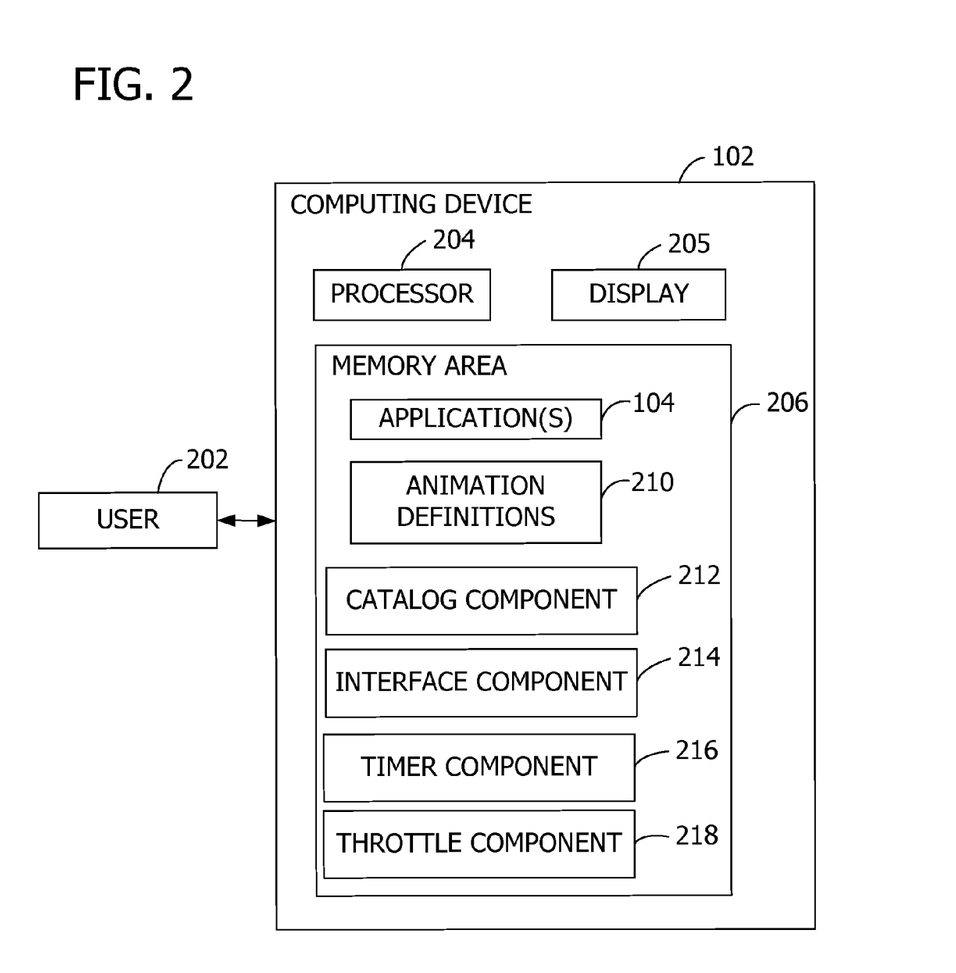
FIG. 2 is an exemplary block diagram illustrating a computing device storing computer-executable components that access the animation definitions.

One or more animation providers 114 provide animation code (e.g., animation extensible markup language code) describing one or more animations. The animation code is stored in the catalog 110. The animation code may be generally referred to as animation definitions 210, although in some embodiments the animation code may be conformed or altered to create an animation definition 210 suitable for storage in the catalog 110. The catalog 110 may be external to the computing device 102 as shown in FIG. 1, or may be stored on the computing device 102 (e.g., as a library) with the animation engine 106 as shown in FIG. 2. For example, the catalog 110 may be loaded into memory as a library by the computing device 102 before an animation is run, in embodiments in which the computing device 102 executes the animation engine 106.

The animation engine 106 is decoupled or otherwise separate from the catalog 110. The animation engine 106 may access the catalog 110 to obtain animation definitions 210 (e.g., using an animation identifier or other pointer or reference included in the animation request), or may receive the animation definitions 210 from the catalog 110 via another component or device (e.g., the API 108).

The application program 104 requests an animation using one of the APIs 108. For example, the application program 104 may request that a particular ML element be moved 50 pixels to the right of its current location. The animation request and the corresponding animation definition 210 are identified and provided as input to the animation engine 106. For example, the API 108 may identify the corresponding animation definition 210 or the animation engine 106 itself may obtain the corresponding animation definition 210. The animation engine 106 performs the animation based on the animation request and the animation definition 210 for display on the computing device 102 (e.g., by the application program 104).

In some embodiments, the requested animation is to be displayed by a browser. Aspects of the disclosure adapt to different browser capabilities. For example, the animation request may identify the browser type. Based on the browser type, the relevant animation definitions 210 are retrieved. For example, if the browser supports JAVASCRIPT scripting language, the animation definitions 210 having JAVASCRIPT code are retrieved. In another example in which the browser supports cascading style sheets (e.g., CSS3), the animation definitions 210 having CSS3 classes are retrieved. In such embodiments, the catalog 110 includes extensions supporting the different browser types, though other means of supporting different browser types are contemplated. The animation engine 106 runs different code to support the different animation technologies such as JAVASCRIPT and CSS3.

Referring next to FIG. 2, an exemplary block diagram illustrates the computing device 102 storing computer-executable components that access the animation definitions 210. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 204, a memory area 206, and at least one display 205. The processor 204 includes any quantity of processing units, and is programmed to execute computer-executable instructions for implementing aspects of the disclosure. The instructions may be performed by the processor 204 or by multiple processors executing within the computing device 102, or performed by a processor external to the computing device 102. In some embodiments, the processor 204 is programmed to execute instructions such as those illustrated in the figures (e.g., FIG. 3 and FIG. 4).

The computing device 102 further has one or more computer readable media such as the memory area 206. The memory area 206 includes any quantity of media associated with or accessible by the computing device 102. The memory area 206 may be internal to the computing device 102 (as shown in FIG. 2), external to the computing device 102 (not shown), or both (not shown).

The memory area 206 stores, among other data, one or more of the applications 104. The applications 104, when executed by the processor 204, operate to perform functionality on the computing device 102. Exemplary applications 104 include mail application programs, web browsers, calendar application programs, address book application programs, messaging programs, media applications, location-based services, search programs, and the like. The applications 104 may communicate with counterpart applications or services such as web services accessible via a network. For example, the applications 104 may represent downloaded client-side applications that correspond to server-side services executing in a cloud.

In the example of FIG. 2, the memory area 206 further stores one or more of the animation definitions 210. The animation definitions 210 may be stored in the memory area 206 as part of a library of animation definitions 210 obtained from another device or service. Exemplary animation definitions 210 include timing data and curve data. The timing data and curve data defines the motion of an ML element using changes in attribute values over time. Aspects of the disclosure, however, contemplate other forms of animation definitions 210 that represent, describe, or define animations in other ways.

The memory area 206 further stores one or more computer-executable components. Exemplary components include a catalog component 212, an interface component 214, a timer component 216, and a throttle component 218. Operation of these components is described below with reference to FIG. 3.

The computing device 102 includes at least one display 205 for displaying the animations to the user 202, along with computer-executable instructions (e.g., a driver) for operating a graphics card to enable the display 205.

In some embodiments, the computing device 102 also includes a communications interface such as a network interface card and/or computer-executable instructions (e.g., a driver) for operating the network interface card.

Figure 3:
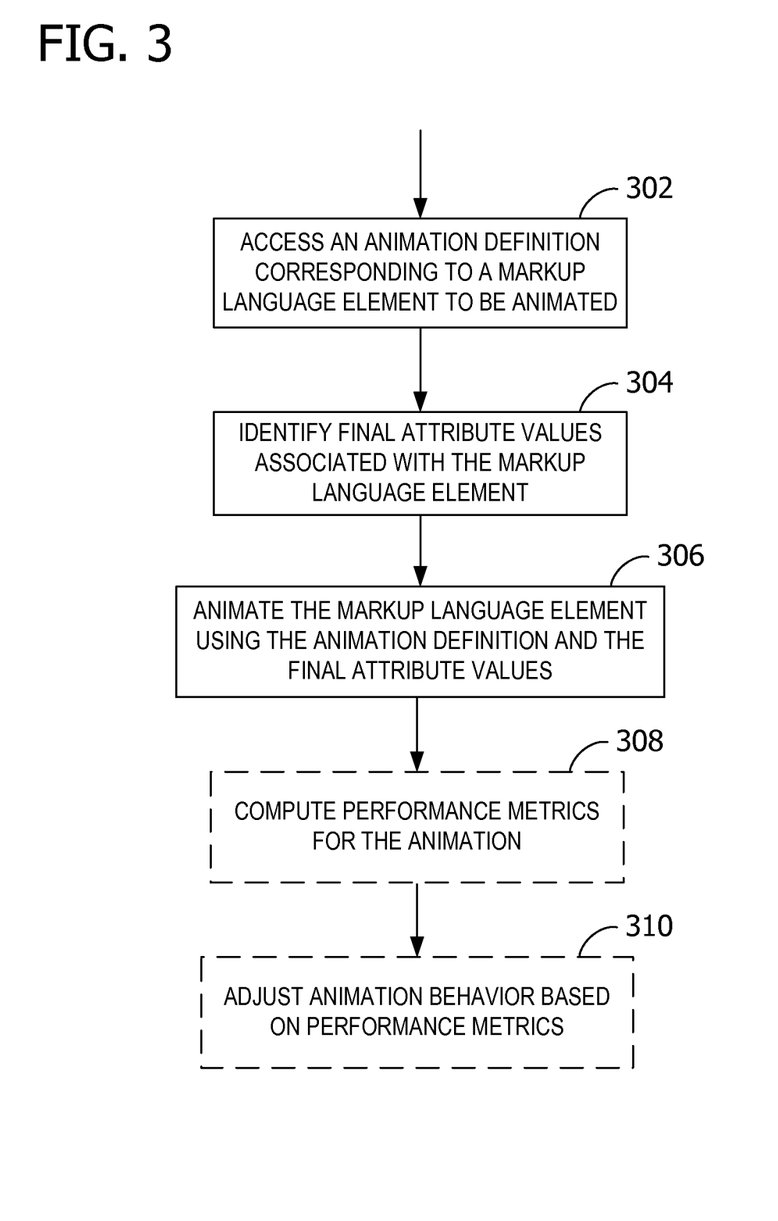
FIG. 3 is an exemplary flow chart illustrating animation of markup language elements and optional adjustment of subsequent animations based on animation performance metrics.

Referring next to FIG. 3, an exemplary flow chart illustrates animation of ML elements and optional adjustment of subsequent animations based on animation performance metrics. The operations illustrated in FIG. 3 may be performed by the computing device 102, or by the cloud service 506 that then provides the animations to the computing device 102. The computing device 102 (or cloud service 506) may animate the ML element using a scripting language (e.g., JAVASCRIPT scripting language) in a browser or with a style sheet language (e.g., cascading style sheets) in a browser.

At 302, the animation definition 210 corresponding to an ML element to be animated is accessed. For example, a browser application or other calling code uses the API 108 to send a request to perform a particular animation on a particular HTML element on a web page. The request may take the form of RunAnimation(animationID). The requested animation has one of the animation definitions 210 corresponding thereto. For example, the requested animation is one of the animations available in the catalog 110 of animation definitions 210. In some embodiments, the animation definition 210 corresponding to the requested animation is accessed to obtain timing and curve information for the animation.

At 304, one or more final attribute values associated with the ML element and the animation are identified. For example, the final attribute values are defined by the called by inclusion as one or more of the arguments in the API 108 call requesting the animation. Alternatively, the final attribute values may be defined in the animation definition 210. The final attribute values represent the end-of-animation values or post-animation values of at least one attribute involved in the requested animation of the ML element. Exemplary attributes include position, height, width, and opacity, although other attributes are contemplated. The position attribute may be a two-dimensional value such as (x,y), three-dimensional value such as (x,y,z), or otherwise. The units of measure for the position, height, and width attributes are represented as pixels, in some embodiments. The opacity may be represented as a percentage or with another metric.

At 306, the ML element is animated using the accessed animation definition 210 and the final attribute values. For example, the animation engine 106 takes the animation definition 210 as input along with the final attribute values to perform the requested animation on the ML element.

In some embodiments, the animation engine 106 may receive requests to animate a plurality of ML elements. Alternatively or in addition, a plurality of animations may be involved in performing the requested animation on a single ML element. For example, deleting an ML element may involve fading out one ML element while transitioning another ML element to a different position. In such embodiments, the animations are coordinated with a single timer executing in a single thread. That is, in some embodiments, the animation engine 106 is a single-threaded application operating on a single timer to perform a plurality of animations on a plurality of ML elements. The single timer enables animations running on different ML elements and attributes to be synchronized thus providing coordination among animations.

Some aspects of the disclosure contemplate monitoring the performance of animations to adjust the behavior of subsequent animations. The animation engine 106, or logic or a device external to the animation engine 106, may perform the monitoring or otherwise collect telemetry data. For example, the browser or a browser plug-in may monitor performance of the animation. At 308, performance metrics for at least one of the animations are computed. Exemplary performance metrics include the frames rendered per second (the frame rate), the total duration of the animation run, the actual number of frames rendered by the browser, the actual time taken to render each frame, the average time per frame, the standard deviation of the actual times taken to render the frames, and the minimum and maximum frame times. The quality and smoothness of the executed animations may be inferred from the performance metrics. At 310, the behavior of subsequent animations may be adjusted based on the performance metrics. For example, if the frames rendered per second drops below a pre-defined threshold such as 24 frames per second, subsequent animations may be automatically disabled. The undesirable frame rate may result from hardware performance issues associated with the machine executing the animation engine 106. In another example, if the standard deviation of the times taken to render the frames drops below a particular threshold (e.g., less than 10), subsequent animations may be automatically disabled. In other examples, the performance metrics may be combined to detect animations perceived by the user 202 as poor (e.g., a frame rate less than 24 and a standard deviation less than 10).

The user 202 may also manually disable animations. For example, the animation engine 106 may be running on a device with a small display or limited resources, or the user 202 perceives that the animations are not smooth (e.g., jerky or jagged). In examples in which the application program 104 is a browser, the disabled animations may be re-enabled when the user 202 re-starts the browser session, opens another browser session, or when the user 202 manually turns on animations.

The performance metrics, or the raw performance data collected during the animation, may be aggregated on a device (e.g., cloud service 506) for analysis by the vendor of the animation engine 106 or the animation providers 114. The analysis may enable identification of animations that render poorly, and may enable identification of improvements.

The computer-executable components illustrated in FIG. 2 may be executed to perform one or more of the operations illustrated in FIG. 3. While described with reference to execution by the processor 204 of the computing device 102, aspects of the disclosure contemplate execute of the components by the cloud service 506. For example, the catalog component 212, when executed by the processor 204, causes the processor 204 to access at least one of the animation definitions 210 corresponding to at least one ML element to be animated. While the catalog 110 and the animation definitions 210 reside on the same device in some embodiments, the catalog component 212 accesses the animation definition 210 in other embodiments by communicating with the cloud service 506 storing the animation definitions 210.

The interface component 214, when executed by the processor 204, causes the processor 204 to identify one or more final attribute values associated with the ML element. For example, the interface component 214 may be the API 108 called by the application program 104. The final attribute values may be included as arguments in an API 108 function call.

The timer component 216, when executed by the processor 204, causes the processor 204 to animate the ML element using the animation definition 210 accessed by the catalog component 212 and the final attribute values identified by the interface component 214.

The throttle component 218, when executed by the processor 204, causes the processor 204 to compute performance metrics for the animation performed by the timer component 216 and to adjust a subsequent animation based on the computed performance metrics. In some embodiments, the throttle component 218 computes the performance metrics during each iteration of a single timer animating the ML element. The throttle component 218 adjusts the subsequent animation by disabling the subsequent animations if the computed performance metrics violate a pre-defined threshold.

Figure 4:
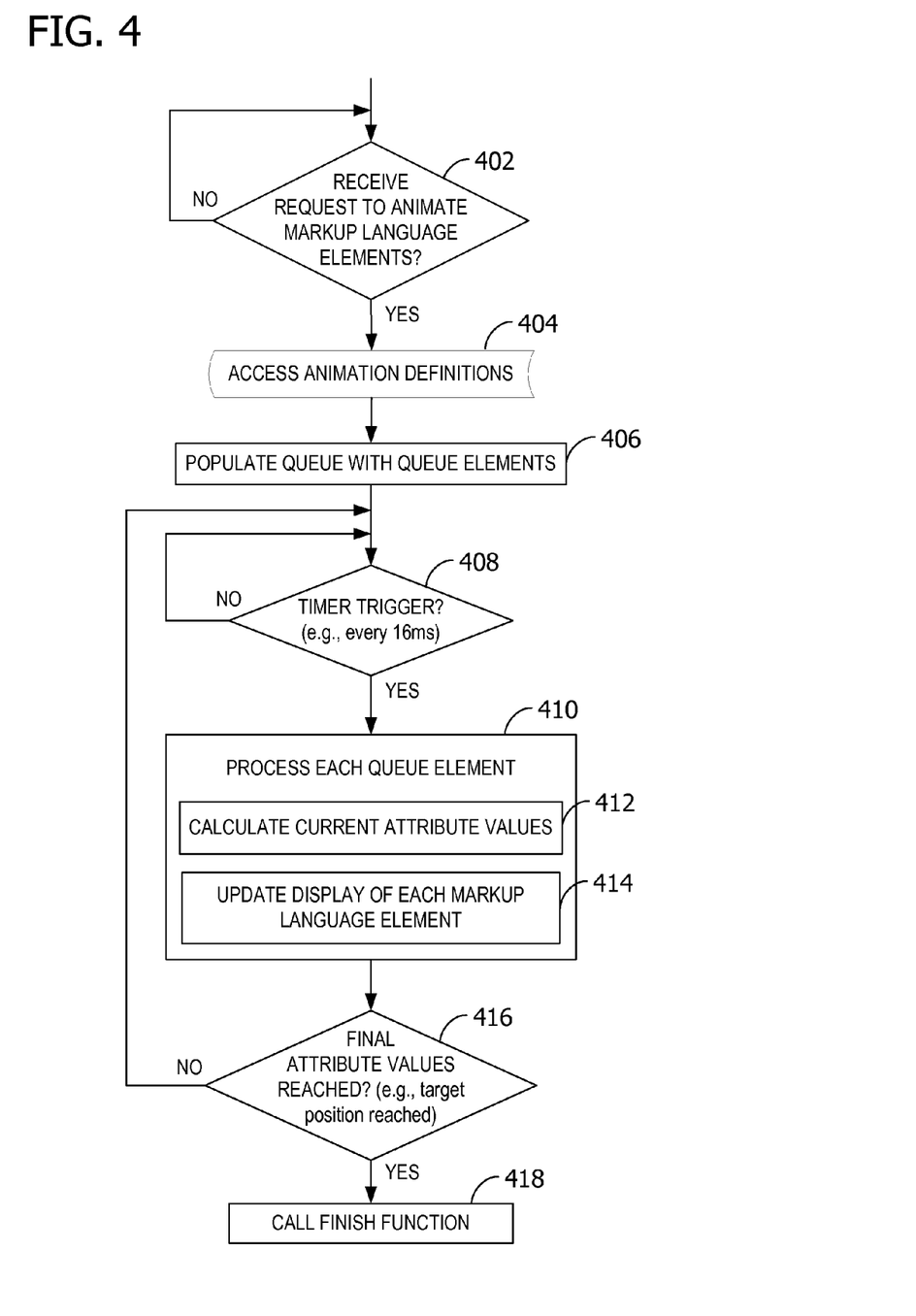
FIG. 4 is an exemplary flow chart illustrating use of a single timer to animate markup language elements with a queue.

Referring next to FIG. 4, an exemplary flow chart illustrates use of a single timer to animate ML elements with a queue 502. The operations illustrated in FIG. 4 may be performed by the animation engine 106. The animation engine 106 may be executed by the computing device 102. In other embodiments, the animation engine 106 may be implemented by the cloud service 506 that provides, during each iteration of the single timer, the ML element updated by the animation to the computing device 102 for display.

If the animation engine 106 receives a request to animate a plurality of ML elements at 402 (e.g., via the API 108 call by the application program 104), the animation engine 106 accesses the animation definition(s) 210 corresponding to the requested animation(s) at 404. For example, the received request identifies one or more animations, and one or more final attribute values associated with the plurality of ML elements and the animations. In some embodiments, the final attribute values correspond to attributes including, but not limited to, horizontal position, vertical position, width, height, and opacity.

At 406, the animation engine 106 populates the queue 502, buffer, or other memory structure with queue elements 504 or animation objects corresponding to the accessed animation definitions 210. The queue 502 represents the currently active animations. The queue elements 504 are defined based at least on the final attribute values and the accessed animation definitions 210. For example, the queue elements 504 represent, or are derived from, the timing data and the curve data from the accessed animation definitions 210. In some embodiments, the animation definitions 210 are divided into components for simultaneous operation. For example, a request to delete a row in a table may include fading out one row while moving up any rows beneath the deleted row. In this example, each of the rows may be represented as an ML element and animations will be performed on each of the ML elements to visually effect the row deletion request.

Once the queue 502 has been populated with the queue elements 504, the animation engine 106 determines whether the single timer has triggered at 408. The single timer may trigger via a stepper function at regular intervals (e.g., every 16 milliseconds to enable 60 frames per second) or irregular intervals (e.g., event-driven). If the timer has triggered at 408, the animation engine 106 processes each of the queue elements 504 at 410. For example, the animation engine 106 calculates current attribute values for each of the attributes being animated for the plurality of ML elements at 412.

The current attribute value for a particular attribute of one of the ML elements may be calculated from the original attribute value before animation (e.g., a start value), the desired final attribute value (e.g., a target value), the desired duration of the animation, and the time vs. value curve from the animation definition 210. For example, to change an attribute value from $P_0$ at time $T_0$ to $P_N$ at time $T_N$ following a curve P=f(T) where $0<=T<=1$, the value $P_i$ at a given time $T_i$ is shown below in Equation (1).

$$P_i = P_0 + f((T_i - T_0)/(T_N - T_0)) * (P_N - P_0) \qquad (1)$$

With each invocation of the timer, the attribute of the ML element is set to the value computed from Equation (1). In this way, animation of a given ML element is achieved by gradually changing the attribute values over a period of time. While embodiments of the disclosure are operable with Equation (1) above, other animation methods for computing attribute values are within the scope of the disclosure.

Each of the ML elements is then displayed in accordance with the calculated current attribute values at 414. In embodiments in which the operations are performed by the cloud service 506, the calculated current attribute values are provided to the computing device 102 to update the display of the ML elements.

If the calculated current attribute values for any of animations correspond to the final attribute values from the received request at 416, the animation has completed. For example, the calculated current attribute values may equal (or approximate) the final attribute values. The animation engine 106 removes the queue elements 504 corresponding to the completed animation from the queue 502, and calls a finish function or callback function at 418 to inform the application program 104 that requested the animation of completion. The finish function includes any means for the animation engine 106 to communicate with the requesting application program 104, or otherwise indicate animation completion (e.g., store a particular value in a particular memory location). In some embodiments, the animation request includes a finish function associated with requested animation or with the ML element. Execution of the finish function may perform post-animation cleanup such as purge data structures, adjusting the state of the animated ML element or other ML elements.

When each of the animations has completed, the timer in the animation engine 106 is turned off or otherwise disabled.

Figure 5:
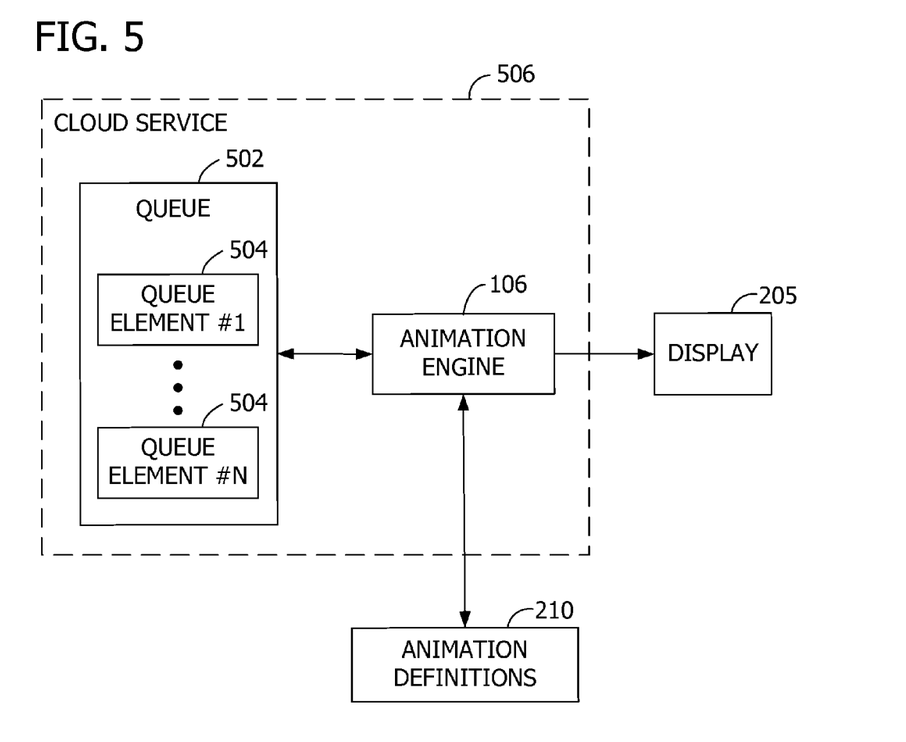
FIG. 5 is an exemplary block diagram illustrating separation of the animation engine from the animation definitions, and animation using queue elements.

Referring next to FIG. 5, an exemplary block diagram illustrates separation of the animation engine 106 using animation definitions 210 to populate the queue 502 and process queue elements 504. In the example of FIG. 5, the animation engine 106 receives or otherwise accesses the animation definitions 210 based on a requested animation. The animation engine 106 populates the queue 502 or other memory structure with queue elements 504 derived from the received animation definitions 210. Exemplary queue elements 504 include queue element #1 through queue element #N.

During animation, the animation engine 106 executes a single timer to process each of the queue elements 504 in sync. That is, during each interval, trigger, activation, or other iteration of the single timer, the animation engine 106 processes each of the queue elements 504 to enable the animations effected by the processing to appear coordinated and/or synchronized. After processing each of the queue elements 504 during an iteration, the animations are displayed or provided to the display 205.

The animation engine 106 and queue 502 may be associated with the cloud service 506, in some embodiments. The cloud service 506 provides the animations to the display via any network, including but not limited to the Internet. In other embodiments, the animation engine 106 and queue 502 may execute on a device connected to the computing device 102 in a peer-to-peer configuration.

ADDITIONAL EXAMPLES

In some embodiments, the animation engine 106 may receive, or check for, additional requests to animate a particular ML element currently being animated. In such an example, the animation engine 106 (or other component) determines whether the animation request is directed to the same attribute currently being animated. If so, the animation engine 106 aborts the current animation for that attribute, stores the current state of the ML element (e.g., the attribute values), and performs the additionally requested animation for that attribute starting with the current state of the ML element. After completing the additional animation, the animation engine 106 calls the finish functions of both of the requested animations. If the additional animation does not affect the attribute of the ML element currently being animated, the animation engine 106 performs the requested, additional animation while the current animation is allowed to run to completion.

In an example animation library, a curve takes the form of a data structure including the following data fields:

```
Curve
{
    Integer ID
    CurveType type; // enum: {Instant, Hold, Linear, CubicBezier}
    float x1, y1, x2, y2; // control points for a CubicBezier curve
}
```

With such an exemplary definition of a curve, curves may be defined by the following call:

g_Curves[ID]=new *SP*Curve(ID, type, *x*1, *y*1, *x*2, *y*2)

However, aspects of the disclosure contemplate other means for defining curve data, and are not limited to the examples herein.

In an exemplary animation library, the animation definition 210 may be represented as an array of KeyFrames with an identifier, as shown in the following data structure.

```
Animation
{
    int ID;
```

-continued

```
        SPKeyFrame[ ] keyFrames;
}
```

The structure of an exemplary KeyFrame is shown below.

```
KeyFrame
{
    KeyFrameType type;     // attribute to animate; enum: {PositionX,
PositionY, Height, Width, Opacity}
    int curveID;           // pointer into the global Curves list
    int startTime;         // starting delay in milliseconds; 0 means start
the animation immediately
    int endTime;           // animation duration
    int startVal;          // starting attribute value; null implies use the
current value of the attribute
    int endVal;            // target attribute value at the end of animation
    bool operationType;    // 0: target value is multiplicative, 1: target
value is additive
    int relativeTo;        // target value is computed 0: based on startVal,
1: based on endVal, 2: is absolute
}
```

With such an exemplary definition of an animation, animations may be defined by the following call:

```
g_Animations[animation.ID] = new SPAnimation(animation.ID, [
    new SPKeyFrame(keyFrame.type, ..., keyFrame.endVal),
    new SPKeyFrame(keyFrame.type, ..., keyFrame.endVal),
    ...
])
```

However, aspects of the disclosure contemplate other means for defining animations, and are not limited to the examples herein.

In some embodiments, the application program 104 or other calling code creates and initializes a new animation object having the desired parameters (e.g., which animation to perform, the final attributes values, etc.). An exemplary function call for creating the animation object includes AnimationObject (animationID, delay, element, finalState, finishFunc, extraData). In this example, the animationID argument represents an identifier for the animation to be run. The value of the identifier is one of the values recognized as corresponding to an animation in the catalog 110. The delay argument represents the number of milliseconds to wait from the current time before the animation is started. If the animation should be started now, this value is set to zero. The element argument represents the ML element to which the animation should be applied. The element argument may be a single element or a plurality of elements to which to apply the same animation. The finalState argument represents the target state for the different attributes to be changed. The target state includes the final attribute values. The finalState argument includes a value for each attribute affected by the current animation. For example, the calling code may define the target state as follows:

```
        var state = new State( );
        state.setAttribute(SPAttribute.PositionX, 500);
        state.setAttribute(SPAttribute.Opacity, 1);
```

If the element parameter is an array, the finalState is an array of state objects with the indices corresponding to those in the element array. For example, finalState[i] includes the state values for element[i].

The finishFunc(animation) argument is a function defined by the calling code. This function is called when the desired animation completes. Upon completion of the animation, the animation engine 106 passes the post-animation AnimationObject as a parameter to the finishFunc function. In some embodiments, the animation parameter for this function is null. The extraData argument identifies additional data that the calling code sends to the finish function. For example, the extraData argument includes context information for doing the finish operation. In some embodiments, the extraData argument is null.

After creating the AnimationObject, the application program 104 then starts the animation. An exemplary function call for starting the animation object includes AnimationObject.RunAnimation( ).

In embodiments of the disclosure in which the animations are rendered by a browser, the animation engine 106 detects page rendering direction and automatically selects left-to-right or right-to-left page rendering transparent to the user 202.

At least a portion of the functionality of the various elements in FIG. 1 and FIG. 2 may be performed by other elements in FIG. 1 or FIG. 2, or an entity (e.g., processor, web service, server, application program, computing device, etc.) not shown in FIG. 1 or FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 202. In such embodiments, notice is provided to the users 202 of the collection of the data (e.g., via a dialog box or preference setting) and users 202 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for animation of ML elements by the animation engine 106 decoupled from the animation catalog 110 storing the animation definitions 210, and exemplary means for throttling animation during an iteration of the single timer based on animation telemetry data obtained during at least one previous iteration of the single timer.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for decoupled animation of markup language (ML) elements using a single timer, said system comprising:
a memory area associated with a computing device, said memory area storing a plurality of animation definitions defining one or more animations applicable to a plurality of ML elements, wherein a change in at least one of the animation definitions is available to each of the plurality of ML elements, and wherein application of a same one of the animation definitions to the plurality of ML elements results in a same animation of the plurality of the ML elements; and
a processor programmed to:
receive at least one request to animate the plurality of ML elements, said request identifying one or more of the animations and one or more final attribute values representing end-of-animation values of at least one attribute associated with the plurality of ML elements and the animations; access the animation definitions in the memory area corresponding to the requested animations;
access the animation definitions in the memory area corresponding to the requested animations;
populate a queue with queue elements based at least on the final attribute values from the received request and the accessed animation definitions stored in the memory area; and
process each of the queue elements in the populated queue during each iteration of a single timer by:
calculating current attribute values for each of the plurality of ML elements; and
displaying each of the ML elements in accordance with the calculated current attribute values.

2. The system of claim 1, wherein the processor is programmed to receive the at least one request by receiving final attribute values corresponding to one or more of the following attributes: horizontal position, vertical position, width, height, and opacity.

3. The system of claim 1, wherein each of the animation definitions stored in the memory area stores timing data and curve data.

4. The system of claim 3, wherein the processor is programmed to populate the queue based on the timing data and the curve data from the accessed animation definition stored in the memory area.

5. The system of claim 1, wherein the processor is further programmed to call a finish function associated with one of the ML elements when the calculated attribute values equal the final attribute values for said one of the ML elements, wherein the finish function triggers execution of another operation.

6. The system of claim 1, wherein the processor is programmed to receive the at least one request from an application program.

7. The system of claim 1, further comprising means for animation of ML elements by an animation engine decoupled from an animation catalog storing the animation definitions, wherein decoupling the animation engine from the animation catalog allows a user to configure the one or more animations by making changes to the animation catalog rather than to each invocation of the animation engine.

8. The system of claim 1, further comprising means for throttling animation during an iteration of the single timer based on animation telemetry data obtained during at least one previous iteration of the single timer.

9. A method comprising:
accessing, by a computing device, at least one animation definition corresponding to at least one markup language (ML) element to be animated, wherein the at least one animation definition is divided into a plurality of components for performing a plurality of animations simultaneously of two or more ML elements associated with the at least one animation definition;
identifying one or more final attribute values associated with the ML element; and animating, by the computing device, the ML element using the accessed animation definition and the identified final attribute values.

10. The method of claim 9, wherein animating the ML element comprises animating, by an animation engine, the ML element, and wherein accessing the at least one animation definition comprises obtaining at least one animation definition from an animation catalog external to the animation engine, the animation catalog being available to multiple ML elements in multiple web pages executing a same animation, wherein a change to the animation catalog is available to the multiple ML elements without re-applying the change individually to each of the multiple ML elements.

11. The method of claim 9, wherein identifying the one or more final attribute values comprises receiving, from an application program, a request including the final attribute values.

12. The method of claim 9, wherein animating the ML element comprises animating a plurality of ML elements using a single timer executing in a single thread.

13. The method of claim 9, wherein animating the ML element comprises animating the ML element with a scripting language in a browser or with a style sheet language in the browser, wherein the animation definitions are accessed based on a type of the browser.

14. The method of claim 9, wherein animating the ML element comprises:
calculating one or more current attribute values for one or more attributes of the ML element based at least on the animation definition and the final attribute values; and
providing the ML element for display in accordance with the calculated current attribute values, wherein a current animation of the ML element is aborted based on a request directed to at least one of the one or more attributes currently being animated for performing an additional animation of the ML element, the additional animation of the ML element being started from the calculated current attribute value for the at least one of the one or more attributes, wherein completion of the current animation and the additional animation is indicated after completion of the additional animation.

15. The method of claim 9, wherein the computing device is associated with a cloud service, and wherein animating the ML element comprises providing, from the cloud service to a browser of the user, animation of the ML element using the accessed animation definition and the identified final attribute values.

16. One or more computer storage media embodying computer-executable components, said components comprising:
a catalog component that when executed causes at least one processor to access at least one animation definition corresponding to at least one markup language (ML) element to be animated;
an interface component that when executed causes at least one processor to identify one or more final attribute values associated with the ML element;
a timer component that when executed causes at least one processor to animate the ML element using the animation definition accessed by the catalog component and the final attribute values identified by the interface component; and
a throttle component that when executed causes at least one processor to compute performance metrics for the animation performed by the timer component and to adjust a subsequent animation, after completing the animation, based on the computed performance metrics.

17. The computer storage media of claim 16, wherein the throttle component computes the performance metrics during each iteration of a single timer animating the ML element and adjusts the subsequent animation by disabling the subsequent animation if the computed performance metrics violate a pre-defined threshold.

18. The computer storage media of claim 16, wherein the catalog component accesses the animation definition by communicating with a cloud service storing the animation definitions.

19. The computer storage media of claim 16, wherein the interface component comprises an application programming interface called by an application program.

20. The computer storage media of claim 16, wherein the throttle component computes the performance metrics by computing one or more of the following: standard deviation, mean, and frames rendered per second.

* * * * *